(12) United States Patent
VanLoon et al.

(10) Patent No.: US 9,929,963 B1
(45) Date of Patent: Mar. 27, 2018

(54) METHODS FOR DYNAMIC HEALTH MONITORING OF SERVER POOLS AND DEVICES THEREOF

(71) Applicant: F5 Networks, Inc., Seattle, WA (US)

(72) Inventors: Michael Lee VanLoon, Kirkland, WA (US); Rachel Gilam Cheng, Bellevue, WA (US)

(73) Assignee: F5 Networks, Inc., Seattle, WA (US)

( * ) Notice: Subject to any disclaimer, the term of this patent is extended or adjusted under 35 U.S.C. 154(b) by 100 days.

(21) Appl. No.: 15/131,588

(22) Filed: Apr. 18, 2016

Related U.S. Application Data

(60) Provisional application No. 62/153,137, filed on Apr. 27, 2015.

(51) Int. Cl.
*H04L 12/815* (2013.01)
*H04L 12/26* (2006.01)
*H04L 12/807* (2013.01)
*H04L 29/08* (2006.01)

(52) U.S. Cl.
CPC ........ *H04L 47/225* (2013.01); *H04L 43/0864* (2013.01); *H04L 47/27* (2013.01); *H04L 43/16* (2013.01); *H04L 67/10* (2013.01)

(58) Field of Classification Search
CPC ... H04L 47/225; H04L 43/0864; H04L 47/27; H04L 67/10; H04L 43/16
See application file for complete search history.

(56) References Cited

U.S. PATENT DOCUMENTS

| 7,826,362 | B2 * | 11/2010 | Price | H04L 45/306 370/232 |
| 7,945,678 | B1 * | 5/2011 | Skene | H04L 45/12 709/227 |
| 8,719,336 | B2 * | 5/2014 | Douceur | A63F 13/12 463/22 |
| 8,768,339 | B2 * | 7/2014 | Yang | H04L 41/0645 455/423 |

(Continued)

OTHER PUBLICATIONS

F5 Networks, Inc., "F5 BIG-IP TMOS: Operations Guide", Manual, Mar. 5, 2015, pp. 1-279.

(Continued)

*Primary Examiner* — Walter J Divito
(74) *Attorney, Agent, or Firm* — LeClairRyan, a Professional Corporation

(57) ABSTRACT

A method, non-transitory computer readable medium, and network traffic management apparatus that receives a response to a ping message from a server device in a server pool and determines a current latency value based on a time difference between when the ping message was sent to the server device and when the response to the ping message was received. A determination is made when the current latency value exceeds an adaptive threshold latency value. The adaptive threshold latency value is based on an average historical latency value and an established threshold factor value. A deficient response value is incremented and a determination is made when the deficient response value exceeds a deficiency threshold value, when the determining indicates that the current latency value exceeds the adaptive threshold latency value. A mitigation action is initiated when the determining indicates that the deficient response value exceeds the deficiency threshold value.

20 Claims, 5 Drawing Sheets

(56) References Cited

U.S. PATENT DOCUMENTS 9,191,269 B2 * 11/2015 Turlington .......... H04L 12/5691
9,374,742 B1 * 6/2016 Malreddy ......... H04W 36/0022

OTHER PUBLICATIONS

F5 Networks, Inc., "F5 Local Traffic Manager and Global Traffic Manager Operations Guide" Manual, Jan. 1, 2015, pp. 1-136.
F5 Networks, Inc., "BIG-IP Local Traffic Manager: Implementations", Manual, Apr. 8, 2014, pp. 1-270, Version 11.5.1.
F5 Networks, Inc., "BIG-IP TMOS: IP Routing Administration", Manual, Apr. 8, 2014, pp. 1-60, Version 11.5.1.
F5 Networks, Inc., "BIG-IP TMOS: Implementations", Manual, Mar. 19, 2015, pp. 1-288, Version 11.5.1.

* cited by examiner

| Active Monitoring Table 34 | | | |
|---|---|---|---|
| Server Device | Sliding Window Buffer | Average Historical Latency Value | Deficient Response Value |
| 1 | | | |
| . . . | . . . | . . . | . . . |
| n | | | |

FIG. 4

METHODS FOR DYNAMIC HEALTH MONITORING OF SERVER POOLS AND DEVICES THEREOF

This application claims the benefit of U.S. Provisional Patent Application Ser. No. 62/153,137, filed on Apr. 27, 2015, which is hereby incorporated by reference in its entirety.

FIELD

This technology relates to methods and devices for dynamically monitoring the health of servers in a server pool.

BACKGROUND

To meet growing data storage and application requirements, server pool are increasing in size. Accordingly, data center hosts are required to manage a large number of servers having various failure rates in a manner that provides a high quality of service for users. Monitoring systems are often used to determine server health by periodically pinging the servers to determine whether the servers are up or down. If a server is determined to be down based on the monitoring, a mitigation action can be taken such as rerouting network traffic away from the down server.

For example, receipt of a negative acknowledge message in response to a ping message sent to a server, such as a connection denied message, route unavailable message, or a message indicating a network condition that makes it impossible to reach a server, can cause the monitoring system to consider the server to be down. In another example, a lack of a response from a server to a ping message within a timeout period can also cause the monitoring system to consider the server as being down.

Unfortunately, current monitoring systems are only able to monitor servers and make a binary decision as to whether a server is currently up or down, which may provide false information if a server is oscillating between states. Additionally, monitoring only for server failure does not provide any insight regarding the quality of service currently being provided by a server or how close a server may be to reaching its capacity. Accordingly, prior failure monitoring techniques are not robust and do not provide sufficient information to make early and effective decisions with respect to the management of a server pool.

SUMMARY

A method for dynamic health monitoring of server pools includes receiving, by a network traffic management apparatus, a response to a ping message from one of a plurality of server devices in a server pool. A current latency value is determined, by the network traffic management apparatus, based on a time difference between when the ping message was sent to the one of the server devices and when the response to the ping message was received. A determination is made, by the network traffic management apparatus, when the current latency value exceeds an adaptive threshold latency value. The adaptive threshold latency value is based on an average historical latency value and an established threshold factor value. A deficient response value is incremented, by the network traffic management apparatus, and a determination is made, by the network traffic management apparatus, when the deficient response value exceeds a deficiency threshold value, when the determining indicates that the current latency value exceeds the adaptive threshold latency value. A mitigation action is initiated, by the network traffic management apparatus, when the determining indicates that the deficient response value exceeds the deficiency threshold value.

A network traffic management apparatus includes memory comprising programmed instructions stored in the memory and one or more processors configured to be capable of executing the programmed instructions stored in the memory to receive a response to a ping message from one of a plurality of server devices in a server pool. A current latency value is determined based on a time difference between when the ping message was sent to the one of the server devices and when the response to the ping message was received. A determination is made when the current latency value exceeds an adaptive threshold latency value. The adaptive threshold latency value is based on an average historical latency value and an established threshold factor value. A deficient response value is incremented and a determination is made when the deficient response value exceeds a deficiency threshold value, when the determining indicates that the current latency value exceeds the adaptive threshold latency value. A mitigation action is initiated when the determining indicates that the deficient response value exceeds the deficiency threshold value.

A non-transitory computer readable medium having stored thereon instructions for dynamic health monitoring of server pools includes executable code which when executed by one or more processors, causes the one or more processors to perform steps including receiving a response to a ping message from one of a plurality of server devices in a server pool. A current latency value is determined based on a time difference between when the ping message was sent to the one of the server devices and when the response to the ping message was received. A determination is made when the current latency value exceeds an adaptive threshold latency value. The adaptive threshold latency value is based on an average historical latency value and an established threshold factor value. A deficient response value is incremented and a determination is made when the deficient response value exceeds a deficiency threshold value, when the determining indicates that the current latency value exceeds the adaptive threshold latency value. A mitigation action is initiated when the determining indicates that the deficient response value exceeds the deficiency threshold value.

This technology has a number of associated advantages including providing methods, non-transitory computer readable media, and network traffic management apparatuses that more effectively monitor the health of server in a server pool in order to initiate appropriate mitigation actions to adjust the configuration of a server pool and thereby improve end user experience. With this technology, server health can be analyzed at a relatively granular level to determine whether a server is approaching capacity, rather than merely whether it is up or down. Additionally, active monitoring of server health can be combined with passive monitoring to generate quality of service (QoS) scores that are a more effective indicator of whether a mitigation action should be initiated.

BRIEF DESCRIPTION OF THE DRAWINGS

FIG. 4 is an exemplary active monitoring table; and

DETAILED DESCRIPTION

Figure 1:
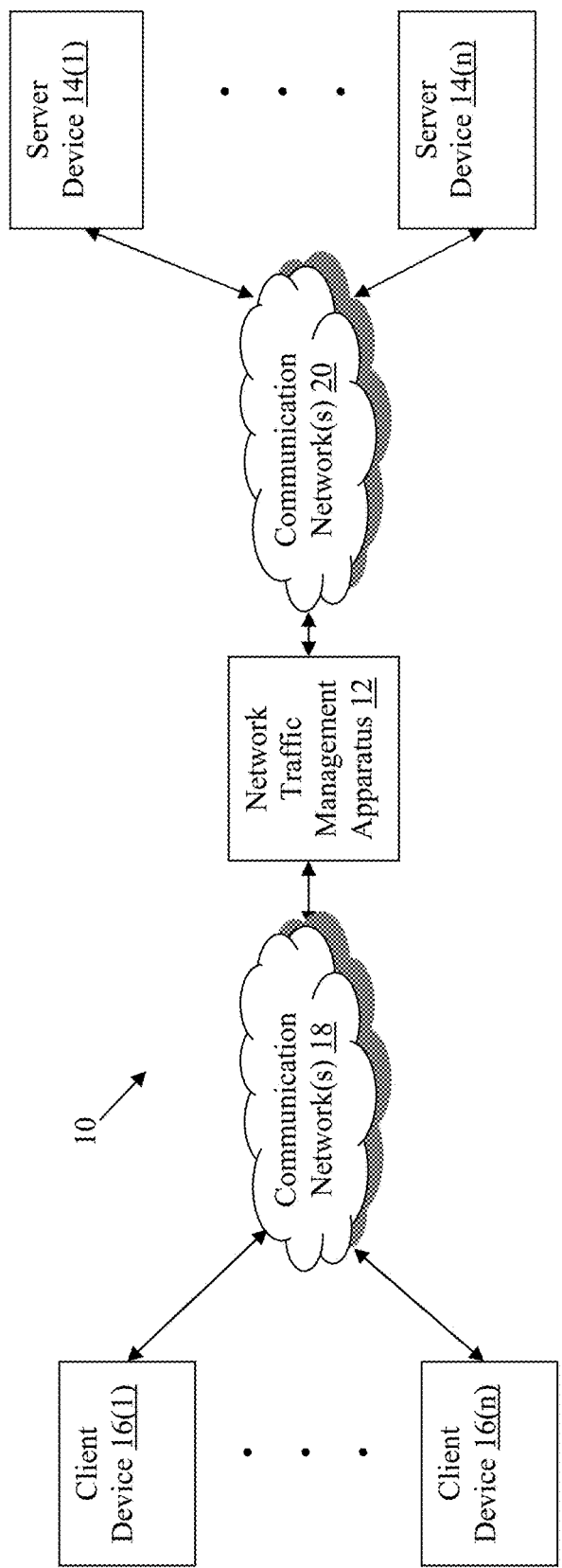
FIG. 1 is a block diagram of a network environment with an exemplary network traffic management apparatus.

Referring to FIG. 1, a system diagram is shown including an exemplary network environment 10 which incorporates an exemplary network traffic management apparatus 12. The network traffic management apparatus 12 is coupled to a plurality of server devices 14(1)-14(n) in a server pool and a plurality of client devices 16(1)-16(n) via communication network(s) 18 and 20, although the network traffic management apparatus 12, server devices 14(1)-14(n), and client devices 16(1)-16(n) may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and network traffic management apparatus that facilitate dynamic health monitoring of server pools and provide more granular information that can be used to more effectively manage network traffic.

Figure 2:
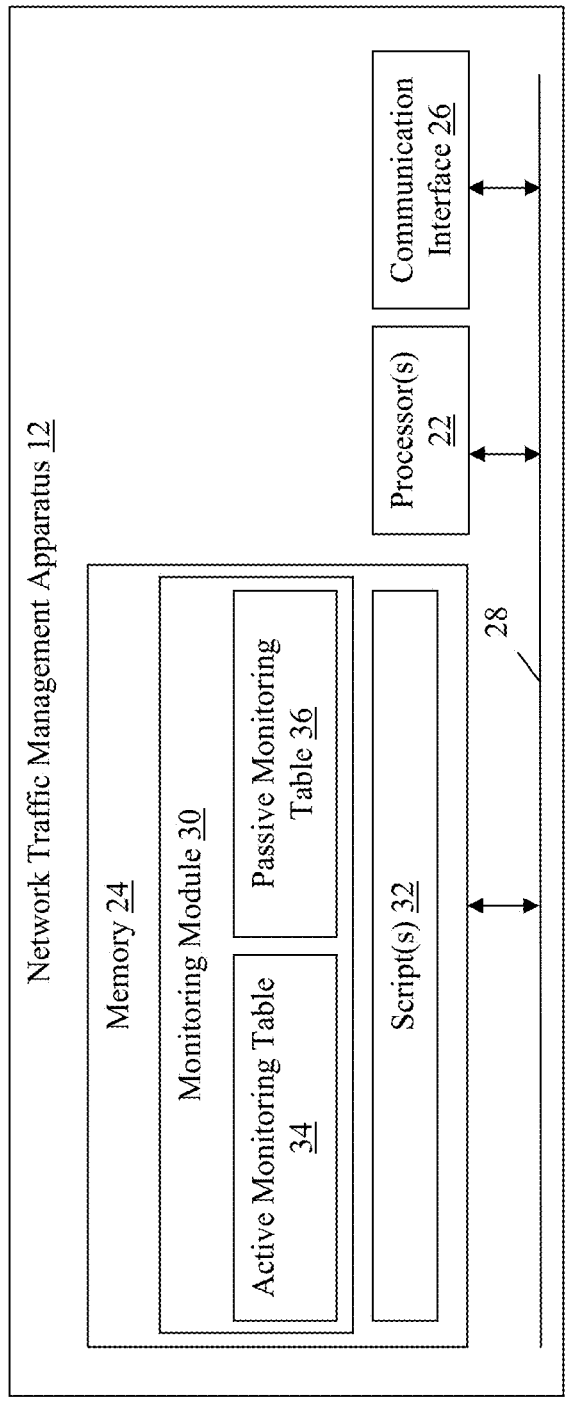
FIG. 2 is a block diagram of the exemplary network traffic management apparatus shown in FIG. 1.

Referring to FIGS. 1-2, the network traffic management apparatus may perform any number of functions including dynamic health monitoring of server pools, accelerating and optimizing network traffic communicated between the server devices 14(1)-14(n) and client devices 16(1)-16(n) in order to improve the user experience, load balancing network traffic to the server devices 14(1)-14(n), and/or implementing firewalls or other security measures on behalf of the server devices 14(1)-14(n), for example. The network traffic management apparatus 12 includes processor(s) 22, memory 24, and a communication interface 26, which are coupled together by a bus 28 or other communication link, although the network traffic management apparatus 12 can include other types and numbers of elements in other configurations.

The processor(s) 22 of the network traffic management apparatus 12 may execute programmed instructions stored in the memory 24 of the network traffic management apparatus 12 for the any number of the functions identified above. The processor(s) 22 of the network traffic management apparatus 12 may include one or more CPUs or general purpose processors with one or more processing cores, for example, although other types of processor(s) can also be used.

The memory 24 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 24.

Accordingly, the memory 24 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more embodiments of this technology, virtual machine(s) running on the network traffic management apparatus 12 may be managed or supervised by a hypervisor.

In this particular example, the memory of the network traffic management apparatus includes a monitoring module 30 and one or more script(s) 32, although the memory 24 can include other policies, modules, databases, or applications, for example. The monitoring module 30 is configured to actively monitor the server devices 14(1)-14(n) by sending ping messages, receiving responses to the ping messages, and analyzing latencies associated with the ping messages, as described and illustrated in more detail later with reference to FIG. 3. The monitoring module 30 in this example includes an active monitoring table 34 that stores information used in the latency analysis, as described and illustrated in more detail later with reference to FIG. 4.

In some examples, the monitoring module 30 is also optionally configured to passively monitor the server devices 14(1)-14(n) based on network traffic exchanged with the server devices 14(1)-14(n) on behalf of the client devices 16(1)-16(n). In these examples, the monitoring module 30 includes an optional passive monitoring table 36 that stores information regarding the monitored network traffic that can be used in combination with the latency information generated by the active monitoring and maintained in the active monitoring table 34. The passive monitoring operation of the monitoring module 30 of the network traffic management apparatus 12 is described and illustrated in more detail later with reference to FIG. 5. In yet other examples, the active and passive monitoring tables 34 and 36 are included in the monitoring module 30 as a combined table or other data storage structure.

The script(s) 32 in this example can optionally be triggered as part of a mitigation action initiated based on a determination made by the monitoring module 30. The scripts can allocate more resources by causing more server devices to come online in a server pool or redirect network traffic away from one of the server devices 14(1)-14(n), for example, as described and illustrated in more detail later with reference to FIGS. 3 and 5.

The communication interface of the network traffic management apparatus 12 operatively couples and communicates between the network traffic management apparatus 12, the server devices 14(1)-14(n), and the client devices 16(1)-16(n), which are all coupled together by the communication network(s) 18 and 20, although other types and numbers of communication networks or systems with other types and numbers of connections and configurations to other devices and elements can also be used.

By way of example only, the communication network(s) 18 and 20 can include local area network(s) (LAN(s)) or wide area network(s) (WAN(s)), and can use TCP/IP over Ethernet and industry-standard protocols, although other types and numbers of protocols and/or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 18 and 20 can also include direct connection(s) (e.g., for when the device illustrated in FIG. 1, such as the network traffic management apparatus 12, client devices 16(1)-16(n), or server devices 14(1)-14(n) operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatus, such as one of the server devices, for example. Moreover, one or more of the devices of the network traffic management apparatus in these examples can be in a same or a different communication network including one or more public, private, or cloud networks, for example.

Each of the server devices 14(1)-14(n) in this example includes one or more processors, a memory, and a communication interface, which are coupled together by a bus or other communication link, although other numbers and types of network devices could be used. The server devices 14(1)-14(n) in this example process requests received from the client devices via the communication network(s) according to the HTTP-based application RFC protocol, for example. Various applications may be operating on the server devices 14(1)-14(n) and transmitting data (e.g., files or Web pages) to the client devices 16(1)-16(n) via the network traffic management apparatus 12 in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network computing devices that operate using a master/slave approach, whereby one of the network computing devices of the server devices 14(1)-14(n) operate to manage and/or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via the communication network(s) 20. In this example, the one or more server devices 14(1)-14(n) operate within the memory 24 of the network traffic management apparatus 12.

The client devices 16(1)-16(n) in this example include any type of computing device that can generate, receive, and process network traffic, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and types of network devices could be used.

The client devices 16(1)-16(n) may run interface applications, such as standard Web browsers or standalone client applications, that may provide an interface to make requests for, and receive content stored on, one or more of the server devices 14(1)-14(n) via the communication network(s) 18 and 20. The client devices 16(1)-16(n) may further include a display device, such as a display screen or touchscreen, and/or an input device, such as a keyboard for example.

Although the exemplary network environment 10 with the network traffic management apparatus 12, server devices 14(1)-14(n), client devices 16(1)-16(n), and communication network(s) 18 and 20 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network, such as the network traffic management apparatus 12, server devices 14(1)-14(n), or client devices 16(1)-16(n), for example, may be configured to operate as virtual instances on the same physical machine. In other words, one or more of the network traffic management apparatus 12, server devices 14(1)-14(n), or client devices 16(1)-16(n) may operate on the same physical device rather than as separate devices communicating through communication network(s). Additionally, there may be more or fewer network traffic management apparatus 12, server devices 14(1)-14(n), or client devices 16(1)-16(n) than illustrated in FIG. 1. The client devices 16(1)-16(n) could also be implemented as applications on the network traffic management apparatus 12 itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Exemplary methods for dynamic health monitoring of a server pool will now be described with reference to FIGS. 1-5. Referring more specifically to FIG. 3, a method for actively monitoring the health of the server devices is illustrated. In step 300 in this example, the network traffic management apparatus 12 receives configuration data from an administrator via an administrator interface, for example. The configuration data in this example includes a latency factor that can be used to generate an adaptive threshold latency value. A response to a ping message may be considered a deficient response when an observed latency of the response is above an average historical latency value plus the latency factor, as described and illustrated in more detail later. The average historical latency value plus the latency factor is referred to herein as the adaptive threshold latency value.

In this example, the configuration data can further include an absolute threshold latency value, which can be used to identify a deficient response to a ping message irrespective of the adaptive threshold latency value. Additionally, the configuration data can include a deficiency threshold value corresponding to a number of consecutive deficient responses or a number of deficient responses within a specified time period. The deficiency threshold value can be used to determine whether a mitigation action should be initiated, as described and illustrated in more detail later.

In this particular example, the configuration data can also include a sliding window buffer length, which corresponds to an amount of time for which latency values should be maintained and used to generate an average historical latency value, and optionally a standard deviation, also as described and illustrated in more detail later. Other types and numbers of configuration data can also be received in step 300 in other examples.

In step 302, the network traffic management apparatus 12 sends a ping message to one of the server devices 14(1)-14(n). Various protocols can be used for the ping message depending on the type of one of the server devices 14(1)-14(n), or content hosted by the one of the server devices 14(1)-14(n), such as TCMP, UDP, TCP, DNS, or HTTP/HTTPS for example, although ping messages corresponding to other protocols can also be used. The ping message is configured to initiate a response by the one of the server devices 14(1)-14(n) that can be recognized by the network traffic management apparatus 12 as a response to the ping message. Optionally, the network traffic management apparatus 12 can store a time at which the ping message was sent or include timestamp information in the ping message that is returned in a response to the ping message.

In step 304, the network traffic management apparatus 12 receives the response to the ping message and determines a current latency value. The current latency value is determined based on the time elapsed between sending and receiving the ping message, although other approaches for determining latency can be used. Accordingly, the network traffic management apparatus 12 can retrieve the time at which the ping message was sent from the memory 24, or from the response to the ping message, for example. The network traffic management apparatus 12 can then in this example determine the current latency value based on the difference between the retrieved time the ping message was sent and the time at which the response to the ping message was received.

In step 306, the network traffic management apparatus generates an adaptive threshold latency value and determines whether the current latency value exceeds the adaptive threshold latency value. The adaptive threshold latency value is generated as an average historical latency value for the server plus the latency factor established by an administrator as part of the configuration data received in step 300 in this example. The average historical latency value can be retrieved from the active monitoring table 34 in the memory 24 and can be generated as described and illustrated in more detail later with reference to step 314 of FIG. 3. If the network traffic management apparatus 12 determines that the current latency value exceeds the adaptive threshold latency value, then the Yes branch is taken to step 308.

In step 308, the network traffic management apparatus 12 increments a deficient response value, which can be maintained in the active monitoring table 34 in the memory 24 for example. The deficient response value corresponds to a number of responses to ping messages for which the associated current latency value was determined to exceed the adaptive threshold latency value generated at the time the responses to the ping messages were received. By using an average historical latency value, the adaptive threshold latency value is dynamic and changes over time, resulting in a more accurate indication of whether a response is deficient.

In another example, the network traffic management apparatus 12 optionally determines in step 306 whether the current latency value exceeds an absolute latency threshold value, which can be established by an administrator as part of the configuration data received in step 300. In this example, the response to the ping message is determined to be deficient in step 306, and the deficient response value is incremented in step 308, when the current latency value exceeds the absolutely latency threshold value and irrespective of the adaptive threshold latency value or whether the current latency value exceeds the adaptive threshold latency value.

In yet another example, the network traffic management apparatus 12 can optionally determine in step 306 whether the current latency value is within a standard deviation of the average historical latency value. The standard deviation can be maintained in the active monitoring table 34, and can be generated as described and illustrated in more detail later with reference to step 314 of FIG. 3. In this example, the response to the ping message is determined to be deficient in step 306, and the deficient response value is incremented in step 308, only when the current latency value is determined to be above the adaptive threshold latency value but within the standard deviation from the average historical latency value.

Accordingly, in this example, out-of-limit current latency values that are above a standard deviation of the average historical latency value and below an absolute threshold latency value are advantageously ignored for purposes of identifying deficient responses. Such out-of-limit current latency values may result from relatively short term or anomalous behavior for which certain mitigation actions (e.g., marking one of the server devices 14(1)-14(n) as down) may not be appropriate. Accordingly, by ignoring such out-of-limit current latency values for purposes of identifying deficient responses, the network traffic management apparatus 12 intelligently implements a preference for consistent trends in behavior for purposes of taking a mitigation action. However, such out-of-limit current latency values are optionally used to update a sliding window buffer and to recalculate the average historical latency value and the standard deviation stored in the active monitoring table 34.

In step 310, the network traffic management apparatus 12 determines whether the deficient response value exceeds a deficiency threshold value established by an administrator as part of the configuration data received in step 300 in this example. The deficiency threshold value can correspond to a number of consecutive deficient responses or a number of deficient responses occurring within a specified historical time period, for example, although other types of deficiency threshold values can also be used. If the network traffic management apparatus 12 determines in step 310 that the deficiency response value exceeds the deficiency threshold value, then the Yes branch is taken to step 312.

In step 312, the network traffic management apparatus 12 initiates a mitigation action. The mitigation action can include executing one or more of the script(s) 32 stored in the memory 24, for example. In one example, at least one of the script(s) 32 is configured to, when executed, instantiate additional resources in the server pool or request that a configuration server do so. The network traffic management apparatus 12 can then generate or receive a new configuration for the server pool including an indication of one or more new ones of the server devices 14(1)-14(n) instantiated for the server pool, which can be used to direct network traffic to the one or more new ones of the server devices 14(1)-14(n).

Accordingly, the network traffic management apparatus 12 in this example can automatically initiate the instantiation of new ones of the server devices 14(1)-14(n) in the server pool in order to provide more resources and reduce latency. In other examples, the mitigation action can include suspending the one of the server devices 14(1)-14(n) but continuing to monitor the one of the server devices 14(1)-14(n), marking the one of the server devices 14(1)-14(n) as down, or rerouting a portion of the network traffic associated with the one of the server devices 14(1)-14(n) to one or more other of the server devices 14(1)-14(n). Other types and numbers of mitigation actions can also be used in other examples.

Subsequent to initiating a mitigation action, or if the network traffic management apparatus 12 determines in step 306 that the adaptive threshold latency value is not exceeded and the No branch is taken from step 310, or in step 310 that the deficiency threshold value is not exceeded and the No branch is taken from step 310, then the network traffic management apparatus 12 proceeds to step 314. In examples in which a standard deviation is generated, the network traffic management apparatus 12 can also take the No branch from step 306 to step 314 if it determines that the current latency value is more than one standard deviation above the average historical latency value, but below the absolute threshold latency value, for example.

In step 314, the network traffic management apparatus 12 updates a sliding window buffer stored in the active monitoring table 34 and recalculates an average historical latency value for the one of the server devices 14(1)-14(n). Referring more specifically to FIG. 4, an exemplary active monitoring table 34 stored in the memory 24 of the network traffic management apparatus 12 is illustrated. In this example, the active monitoring table 34 includes a unique identifier of each of the server devices 14(1)-14(n) in the server pool, and a sliding window buffer, average historical latency value, and deficient response value for each of the server devices 14(1)-14(n).

In other examples, the active monitoring table 34 can also include a standard deviation for each of the server devices 14(1)-14(n), and the active monitoring table 34 can optionally store the latency factor and absolute threshold latency value, which may be the same for all of the server devices 14(1)-14(n) or different for one or more of the server devices 14(1)-14(n). Other information and data can also be stored in the active monitoring table 34 in other examples.

Referring back to FIG. 3, in this particular example, the network traffic management apparatus 12 inserts the current latency value into a sliding window buffer corresponding to the one of the server devices 14(1)-14(n) in step 314. Additionally, the network traffic management apparatus 12 removes an oldest latency value from the sliding window buffer when the sliding window buffer is determined to be full based on the sliding window buffer length established by an administrator as part of the configuration data received in step 300, for example.

Also in step 314, the network traffic management apparatus 12 recalculates and stores the average historical latency value based on the current contents of the sliding window buffer, which include the latencies previously determined for each iteration of step 304 for the one of the server devices 14(1)-14(n) over a historical period of time corresponding to the sliding window buffer length. Optionally, the network traffic management apparatus 12 also recalculates and stores the standard deviation based on the current contents of the sliding window buffer for the one of the server devices 14(1)-14(n).

In examples in which the deficient response value for the one of the server devices 14(1)-14(n) was not incremented in step 308, the network traffic management apparatus 12 can determine whether the deficient response value for the one of the server devices 14(1)-14(n) should be reset. For example, if the deficiency threshold value is established by an administrator to be based on a number of consecutive deficient responses, then the deficient response value should be reset if the deficient response value was not incremented in the most recent iteration of step 308.

In another example, irrespective of whether the deficient response value for the one of the server devices 14(1)-14(n) was incremented in the most recent iteration of step 308, the network traffic management apparatus 12 can determine whether the deficient response value for the one of the server devices 14(1)-14(n) should be decremented. In this example, the deficient response value can be established by an administrator to be based on a number of deficient responses occurring within a historical period of time. Accordingly, if a response in the sliding window buffer received prior to the established historical period of time, or the response most recently evicted from the sliding window buffer in examples in which the historical period of time corresponds with the length of the sliding window buffer, was a deficient response, then the network traffic management apparatus 12 may decrement the deficient response value.

Accordingly, in this particular example, the network traffic management apparatus 12 can optionally mark an entry in the sliding window buffer as deficient in order to determine whether it falls outside the established historical period of time requiring the deficient response value to be decremented. Other types and numbers of deficiency threshold values can also be used. Additionally, other methods of maintaining the deficient response can also be used in other examples.

Subsequent to updating the sliding window buffer and recalculating the average historical latency value in step 314, the network traffic management apparatus 12 proceeds back to step 302 and sends another ping message to the one of the server devices 14(1)-14(n). Optionally, the network traffic management apparatus 12 can send ping messages periodically as established by an administrator, and one or more of steps 304-314 can occur in parallel for any number of ping messages. Additionally, the steps 302-314 can occur in parallel for any number of the server devices 14(1)-14(n) in the server pool. Accordingly, by using an adaptive threshold latency value and dynamically monitoring health of the server devices 14(1)-14(n) as described and illustrated herein with reference to FIG. 3, the network traffic management apparatus 12 can more accurately determine when one of the server devices 14(1)-14(n) is approaching its limit, and more effectively initiate an appropriate mitigating action.

Figure 5:
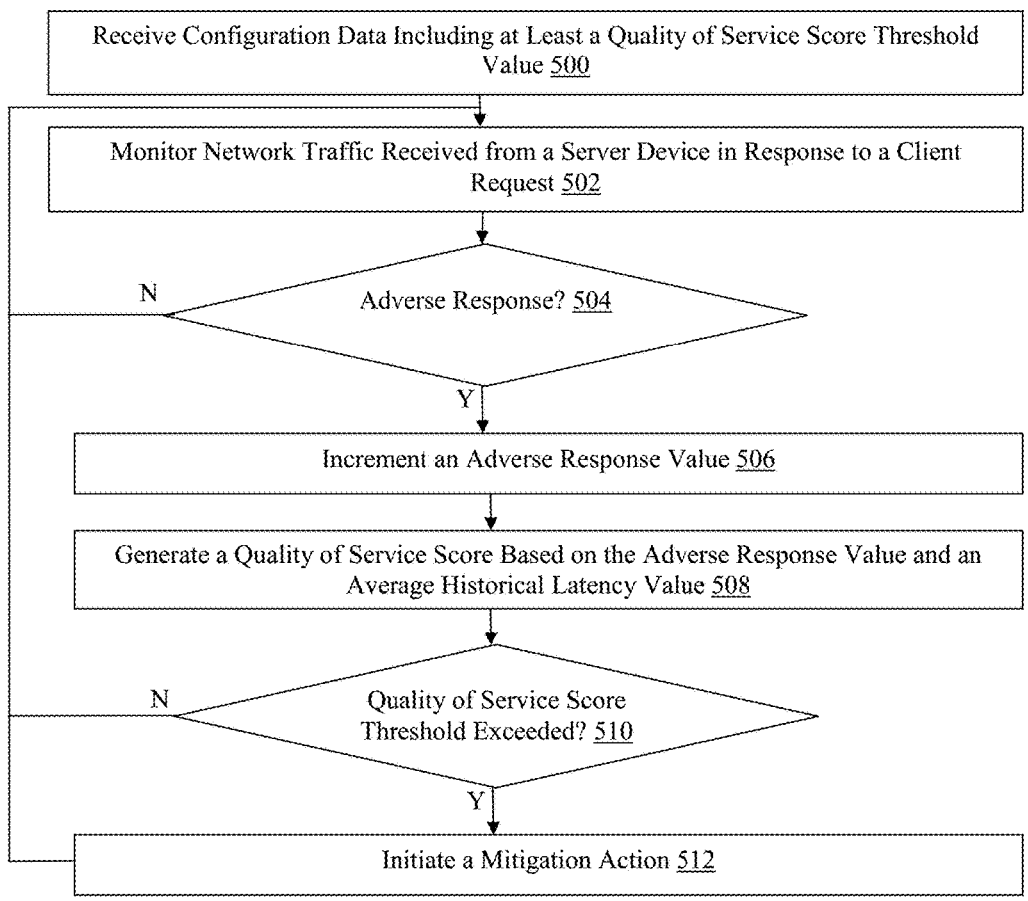
FIG. 5 is a flowchart of an exemplary method for passively monitoring the health of the server devices in a server pool and using active and passive indications to determine a mitigation action.

Referring more specifically to FIG. 5, a method for passively monitoring the health of the server devices in a server pool, and using active and passive indications to determine a mitigation action, is illustrated. In step 500 in this example, the network traffic management apparatus 12 receives configuration data including at least a quality of service (QoS) score threshold value. The configuration data can be received from an administrator via an administrator interface, for example.

In step 502, the network traffic management apparatus 12 monitors network traffic received from one of the server devices 14(1)-14(n) in response to request(s) from the client devices 16(1)-16(n). Accordingly, the network traffic management apparatus 12 in this example proxies request for content or services hosted by the server devices 14(1)-14(n) on behalf of the client devices 16(1)-16(n). The network traffic received from the one of the server devices 14(1)-14(n) in this example can include TCP acknowledgements, HTTP responses that include content, as well as adverse responses such as a TCP resets or HTTP 404 standard response codes, although other types of responses including other types of adverse responses can also be received by the network traffic management apparatus 12.

In step 504, the network traffic management apparatus 12 determines whether a response received as part of the monitored network traffic is an adverse response. If the network traffic management apparatus 12 determines that it has received an adverse response, then the Yes branch is taken to step 506.

In step 506, the network traffic management apparatus increments an adverse response value stored in the memory. Optionally, the adverse response value can be stored in the passive monitoring table 36 as associated with a unique identifier of the one of the server devices 14(1)-14(n). The adverse response value corresponds to a number of adverse responses received over a historical period of time, which can be established by an administrator. Optionally, a time at which the adverse response is received can also be maintained in the passive monitoring table 36, which can be used to update the adverse response value, as described and illustrated in more detail later.

In step 508, the network traffic management apparatus 12 generates a QoS score based on the adverse response value and an average historical latency value for the one of the server devices 14(1)-14(n). In one example, the average historical latency value is generated as described and illustrated in more detail earlier with reference to step 314 of FIG. 3, and is obtained from the active monitoring table 34 stored in the memory 24, for example. However, other methods of generating the average historical latency value can also be used in other examples.

Optionally, various weights can be applied to the adverse response value and average historical latency value in order to generate the QoS score. Accordingly, in this example, the QoS score is a relatively robust value representing parameters derived from both active and passive monitoring of the server devices 14(1)-14(n) by the network traffic management apparatus 12.

Optionally, the QoS score can be stored in the passive monitoring table 36 as associated with a unique identifier of the one of the server devices 14(1)-14(n). Also optionally, the active and passive monitoring tables 34 and 36 can be combined into one table and at least the adverse response value and QoS score can be additional parameters stored in the combined table for one or more of the server devices 14(1)-14(n).

In step 510, the network traffic management apparatus 12 determines whether the QoS score generated in step 510 exceeds the QoS score threshold value established by an administrator as part of the configuration data received in step 500. If the network traffic management apparatus 12 determines that the QoS score exceeds the QoS score threshold value, then the Yes branch is taken to step 512.

Figure 3:
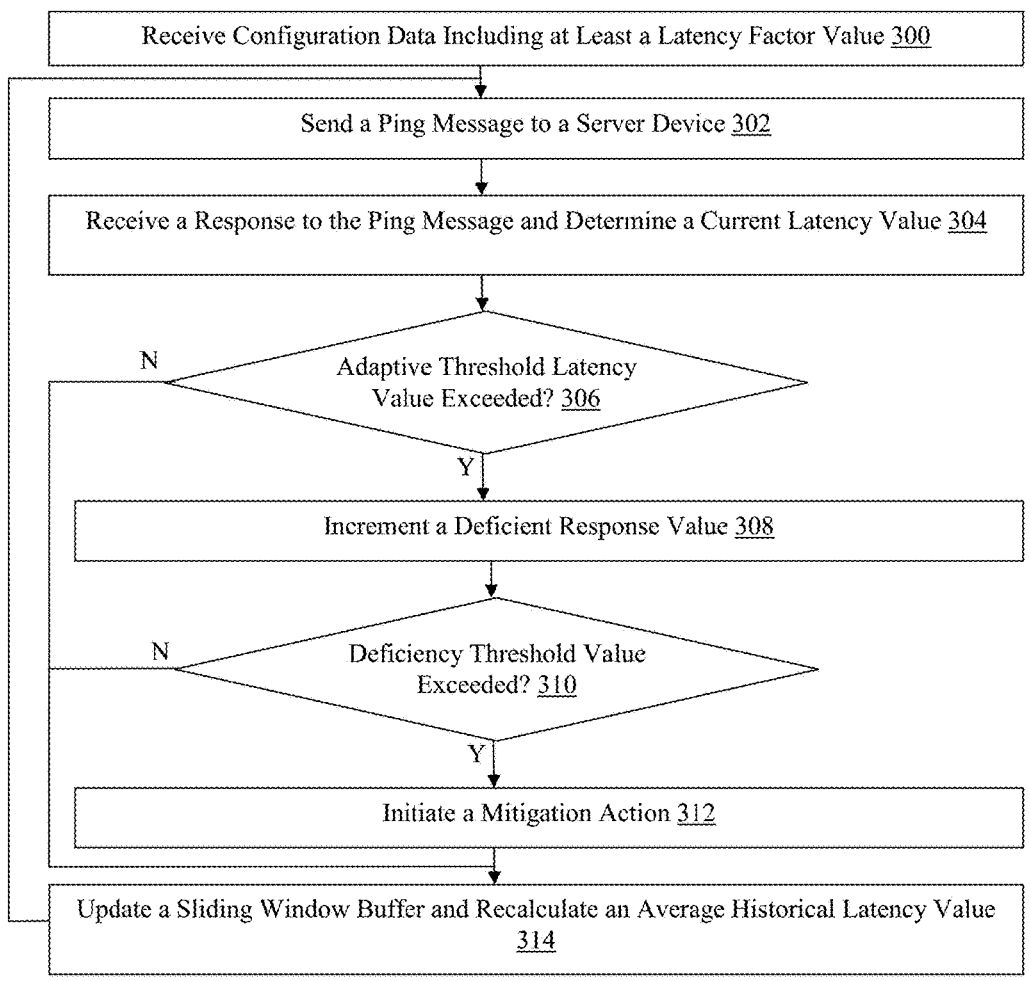
FIG. 3 is a flowchart of an exemplary method for actively monitoring the health of the server devices.

In step 512, the network traffic management apparatus 12 initiates a mitigation action, as described and illustrated in more detail earlier with reference to step 312 of FIG. 3. Subsequent to initiating the mitigation action, or if the network traffic management apparatus 12 determines in step 504 that an adverse response has not been received and the No branch is taken from step 504, or in step 510 that the QoS score threshold value has not been exceeded and the No branch is taken from step 510, then the network traffic management apparatus 12 proceeds back to step 502 and continues monitoring network traffic.

Optionally, the network traffic management apparatus 12 also determines whether the adverse response value should be updated or decremented based on the established historical time period. Accordingly, the network traffic management apparatus 12 can determine whether the adverse response value represents adverse responses received prior to the historical time period. The determination can be made by the network traffic management apparatus 12 based on the time of the adverse response, which was optionally stored in the passive monitoring table 36 as described and illustrated earlier, although other methods of maintaining the adverse response value can also be used.

With this technology, health monitoring of servers can be performed dynamically so that thresholds for server responsiveness are adjusted over time based on historical responsiveness. Accordingly, server health can be more effectively analyzed at a relatively granular level allowing a determination of whether a server is approaching capacity, rather than merely whether it is up or down. Additionally, scripts can be automatically triggered to initiate mitigation actions and adjust the configuration of a server pool. Advantageously, such active monitoring based on latencies associated with ping messages can be combined with passive monitoring of network traffic and associated adverse responses to generate a QoS score than can be used to more effectively initiate mitigation actions.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for dynamic health monitoring of server pools implemented by a network traffic management system comprising one or more traffic management apparatuses, server devices, or client devices, the method comprising:
   receiving a response to a ping message from one of a plurality of servers of a server pool and determining a current latency value based on a time difference between when the ping message was sent to the one of the servers and when the response to the ping message was received;
   determining when the current latency value exceeds an adaptive threshold latency value, wherein the adaptive threshold latency value is based on an average historical latency value and a latency factor;
   incrementing a deficient response value and determining when the deficient response value exceeds a deficiency threshold value, when the determining indicates that the current latency value exceeds the adaptive threshold latency value; and
   initiating a mitigation action, when the determining indicates that the deficient response value exceeds the deficiency threshold value.

2. The method as set forth in claim 1, further comprising:
   inserting the current latency value into a sliding window buffer and removing an oldest latency value from the sliding window buffer; and
   recalculating a standard deviation and the average historical latency value based on contents of the sliding window buffer.

3. The method as set forth in claim 1, further comprising:
   determining when the current latency value is within a standard deviation from the average historical latency value and when the current latency value exceeds an absolute latency threshold value; and
   incrementing the deficient response value and determining when the deficient response value exceeds the deficiency threshold value, when the determining indicates that the current latency value is within the standard deviation from the average historical latency value or the current latency value exceeds the absolute latency threshold value.

4. The method as set forth in claim 1, wherein the initiating the mitigation action comprises executing a script configured to communicate with a configuration server and receive a new configuration for the server pool, the new configuration comprising at least identifying data for one or more new servers instantiated for the server pool.

5. The method as set forth in claim 1, further comprising:
   generating a quality of service (QoS) score based on a number of adverse responses associated with network traffic received from the one of the servers in response to client requests over a historical period of time and the average historical latency value; and
   determining when the QoS score exceeds a QoS score threshold value, wherein the mitigation action is only initiated when the determining indicates that the QoS score exceeds the QoS score threshold value.

6. A non-transitory computer readable medium having stored thereon instructions for dynamic health monitoring of server pools comprising executable code which when executed by one or more processors, causes the one or more processors to:
   receive a response to a ping message from one of a plurality of servers of a server pool and determine a current latency value based on a time difference between when the ping message was sent to the one of the servers and when the response to the ping message was received;
   determine when the current latency value exceeds an adaptive threshold latency value, wherein the adaptive threshold latency value is based on an average historical latency value and a latency factor;
   increment a deficient response value and determine when the deficient response value exceeds a deficiency threshold value, when the determining indicates that the current latency value exceeds the adaptive threshold latency value; and
   initiate a mitigation action, when the determining indicates that the deficient response value exceeds the deficiency threshold value.

7. The non-transitory computer readable medium as set forth in claim 6, wherein the executable code when executed by the one or more processors further causes the one or more processors to:
   insert the current latency value into a sliding window buffer and removing an oldest latency value from the sliding window buffer; and
   recalculate a standard deviation and the average historical latency value based on contents of the sliding window buffer.

8. The non-transitory computer readable medium as set forth in claim 6, wherein the executable code when executed by the one or more processors further causes the one or more processors to:
   determine when the current latency value is within a standard deviation from the average historical latency value and when the current latency value exceeds an absolute latency threshold value; and
   increment the deficient response value and determine when the deficient response value exceeds the deficiency threshold value, when the determining indicates that the current latency value is within the standard deviation from the average historical latency value or the current latency value exceeds the absolute latency threshold value.

9. The non-transitory computer readable medium as set forth in claim 6, wherein the executable code when executed by the one or more processors further causes the one or more processors to execute a script configured to communicate with a configuration server and receive a new configuration for the server pool, the new configuration comprising at least identifying data for one or more new servers instantiated for the server pool.

10. The non-transitory computer readable medium as set forth in claim 6, wherein the executable code when executed by the one or more processors further causes the one or more processors to:
   generate a quality of service (QoS) score based on a number of adverse responses associated with network traffic received from the one of the servers in response to client requests over a historical period of time and the average historical latency value; and determine when the QoS score exceeds a QoS score threshold value, wherein the mitigation action is only initiated when the determining indicates that the QoS score exceeds the QoS score threshold value.

11. A network traffic management apparatus comprising memory comprising programmed instructions stored thereon and one or more processors configured to be capable of executing the stored programmed instructions to:

receive a response to a ping message from one of a plurality of servers of a server pool and determine a current latency value based on a time difference between when the ping message was sent to the one of the servers and when the response to the ping message was received;

determine when the current latency value exceeds an adaptive threshold latency value, wherein the adaptive threshold latency value is based on an average historical latency value and a latency factor;

increment a deficient response value and determine when the deficient response value exceeds a deficiency threshold value, when the determining indicates that the current latency value exceeds the adaptive threshold latency value; and initiate a mitigation action, when the determining indicates that the deficient response value exceeds the deficiency threshold value.

12. The network traffic management apparatus as set forth in claim 11, wherein the one or more processors are further configured to be capable of executing the stored programmed instructions to:

insert the current latency value into a sliding window buffer and remove an oldest latency value from the sliding window buffer; and recalculate a standard deviation and the average historical latency value based on contents of the sliding window buffer.

13. The network traffic management apparatus as set forth in claim 11, wherein the one or more processors are further configured to be capable of executing the stored programmed instructions to:

determine when the current latency value is within a standard deviation from the average historical latency value and when the current latency value exceeds an absolute latency threshold value; and increment the deficient response value and determine when the deficient response value exceeds the deficiency threshold value, when the determining indicates that the current latency value is within the standard deviation from the average historical latency value or the current latency value exceeds the absolute latency threshold value.

14. The network traffic management apparatus as set forth in claim 11, wherein the one or more processors are further configured to be capable of executing the stored programmed instructions to execute a script configured to communicate with a configuration server and receive a new configuration for the server pool, the new configuration comprising at least identifying data for one or more new servers instantiated for the server pool.

15. The network traffic management apparatus as set forth in claim 11, wherein the one or more processors are further configured to be capable of executing the stored programmed instructions stored to:

generate a quality of service (QoS) score based on a number of adverse responses associated with network traffic received from the one of the servers in response to client requests over a historical period of time and the average historical latency value; and determine when the QoS score exceeds a QoS score threshold value, wherein the mitigation action is only initiated when the determining indicates that the QoS score exceeds the QoS score threshold value.

16. A network traffic management system comprising one or more traffic management apparatuses, server devices, or client devices, the network traffic management system comprising memory comprising programmed instructions stored thereon and one or more processors configured to be capable of executing the stored programmed instructions to:

receive a response to a ping message from one of a plurality of servers of a server pool and determine a current latency value based on a time difference between when the ping message was sent to the one of the servers and when the response to the ping message was received;

determine when the current latency value exceeds an adaptive threshold latency value, wherein the adaptive threshold latency value is based on an average historical latency value and a latency factor;

increment a deficient response value and determine when the deficient response value exceeds a deficiency threshold value, when the determining indicates that the current latency value exceeds the adaptive threshold latency value; and initiate a mitigation action, when the determining indicates that the deficient response value exceeds the deficiency threshold value.

17. The network traffic management system of claim 16, wherein the one or more processors are further configured to be capable of executing the stored programmed instructions to:

insert the current latency value into a sliding window buffer and remove an oldest latency value from the sliding window buffer; and recalculate a standard deviation and the average historical latency value based on contents of the sliding window buffer.

18. The network traffic management system of claim 16, wherein the one or more processors are further configured to be capable of executing the stored programmed instructions to:

determine when the current latency value is within a standard deviation from the average historical latency value and when the current latency value exceeds an absolute latency threshold value; and increment the deficient response value and determine when the deficient response value exceeds the deficiency threshold value, when the determining indicates that the current latency value is within the standard deviation from the average historical latency value or the current latency value exceeds the absolute latency threshold value.

19. The network traffic management system of claim 16, wherein the one or more processors are further configured to be capable of executing the stored programmed instructions to execute a script configured to communicate with a configuration server and receive a new configuration for the server pool, the new configuration comprising at least identifying data for one or more new servers instantiated for the server pool.

20. The network traffic management system of claim 16, wherein the one or more processors are further configured to be capable of executing the stored programmed instructions to:
  generate a quality of service (QoS) score based on a number of adverse responses associated with network traffic received from the one of the servers in response to client requests over a historical period of time and the average historical latency value; and
  determine when the QoS score exceeds a QoS score threshold value, wherein the mitigation action is only initiated when the determining indicates that the QoS score exceeds the QoS score threshold value.

* * * * *